(No Model.) 8 Sheets—Sheet 1.

T. TORRANCE & J. H. HOWELL.
MACHINE FOR STRAINING PULP FOR PAPER MAKING.

No. 535,471. Patented Mar. 12, 1895.

Witnesses:
E. B. Bolton
H. van Oldenneel

Inventors:
Thomas Torrance
James Henry Howell
By Richards
their Attorneys.

(No Model.) 8 Sheets—Sheet 2.
T. TORRANCE & J. H. HOWELL.
MACHINE FOR STRAINING PULP FOR PAPER MAKING.
No. 535,471. Patented Mar. 12, 1895.

(No Model.) 8 Sheets—Sheet 4.

T. TORRANCE & J. H. HOWELL.
MACHINE FOR STRAINING PULP FOR PAPER MAKING.

No. 535,471. Patented Mar. 12, 1895.

(No Model.) 8 Sheets—Sheet 5.

T. TORRANCE & J. H. HOWELL.
MACHINE FOR STRAINING PULP FOR PAPER MAKING.

No. 535,471. Patented Mar. 12, 1895.

Witnesses:
E. B. Bolton
H. van Oldenneef

Inventors:
Thomas Torrance
James Henry Howell
By Richards
their Attorneys.

(No Model.) 8 Sheets—Sheet 6.

T. TORRANCE & J. H. HOWELL.
MACHINE FOR STRAINING PULP FOR PAPER MAKING.

No. 535,471. Patented Mar. 12, 1895.

Witnesses:
E. B. Bolton
H. van Oldennee

Inventors:
Thomas Torrance
James Henry Howell
By Richards
their Attorneys.

(No Model.) 8 Sheets—Sheet 7.

T. TORRANCE & J. H. HOWELL.
MACHINE FOR STRAINING PULP FOR PAPER MAKING.

No. 535,471. Patented Mar. 12, 1895.

Witnesses
E. B. Bolton
H. Van Oldenneel

Inventors:
Thomas Torrance
James Henry Howell
By Richardson R
their Attorneys.

(No Model.) 8 Sheets—Sheet 8.

T. TORRANCE & J. H. HOWELL.
MACHINE FOR STRAINING PULP FOR PAPER MAKING.

No. 535,471. Patented Mar. 12, 1895.

UNITED STATES PATENT OFFICE.

THOMAS TORRANCE, OF BITTON, AND JAMES HENRY HOWELL, OF BRISTOL, ENGLAND.

MACHINE FOR STRAINING PULP FOR PAPER-MAKING.

SPECIFICATION forming part of Letters Patent No. 535,471, dated March 12, 1895.

Application filed February 8, 1894. Serial No. 499,507. (No model.) Patented in England December 15, 1892, No. 23,082, and July 13, 1893, No. 13,587.

*To all whom it may concern:*

Be it known that we, THOMAS TORRANCE, residing at Bitton, and JAMES HENRY HOWELL, residing at 104 Pembroke Road, Clifton, in the city of Bristol, in the county of Gloucester, England, subjects of Her Majesty the Queen of Great Britain, have invented a new and useful Machine for Straining Pulp for Paper-Making, (for which we have obtained patents in Great Britain, No. 23,082, dated December 15, 1892, and No. 13,587, dated July 13, 1893,) of which the following is a specification.

The improvements constituting our invention, consist of means for the more perfectly and effectually dealing with all kinds of pulp used in paper making, after leaving the beaters, and before entering upon the paper making machine, than has been attained by any of the methods and means hitherto employed, at which period the said pulp has always to undergo a process of straining for the purpose of removing therefrom what is known as "knots" or hanks or such particles of foreign matter as would be objectionable or detrimental to the desired texture and finish of the paper, and this has hitherto been only imperfectly attained by the employment of agitated flat sieve-like surfaces over which the said pulp has been caused to flow, and the slits or meshes formed in said sieves, and through which the pulp in its approved condition was desired to pass, have necessarily been of such infinitesimal dimensions, and the process of straining so slow and irregular, that the more or less clogging or choking of said slits has invariably resulted, and with a view to overcome this difficulty, means have been resorted to for forming a vacuum beneath the said sieve like surface, in order that the atmospheric pressure upon the upper surface of the pulp might push or force it through, but by reason of consolidation or coagulation, arising from the irregular or intermittent passage through the said slits or meshes, the pulp, in this process, gathered upon the under edges of these orifices, until dislodged by gravity, vibration or otherwise, which falling into the strained pulp would render this again in a more or less unsatisfactory condition, and to overcome these difficulties and objectionable results, is the object and purpose of our invention, which we attain by providing in lieu of said sieve a surface composed of a series of parallel or tapered rollers, rods or bars, of various shapes and dimensions in cross section, which we cause to rotate, oscillate, rise and fall or otherwise, (in some cases or where convenient between stationary substances) so that the pulp when floated thereon, is thereby kept in a continuous state of agitation, and by the employment of a novel adjusting mechanism the space between the said rollers, or between the said rods or bars, or between these and the stationary parts that accompany them, and through which the pulp is allowed to pass if in a proper and workable condition, may be gaged with the greatest precision, according to the width of the cut desired, while such "knotty" or combined portions of the pulp as would not pass through said spaces or divisions, would be conveyed by gravity or other means into suitable vessels or channels, through which it would be caused to pass by pumping or otherwise, to be again treated in a similar manner, (in some cases after passing through auxiliary knotters) in combination with fresh pulp, and by these means we obtain a continuous unvarying delivery of the strained pulp without the slightest sign of consolidation or coagulation, and choking or clogging of the straining medium or waste of good or usable material becomes a matter of impossibility.

In order that our invention, and the manner of its operation may be clearly understood, we have appended hereunto seven sheets of drawings, throughout which the same reference letters have been used when referring to the same, like or equivalent parts.

Fig. 3, Sheet 2, is a side elevation of the same machine, while Fig. 4½ is a sectional view through the rollers. Figs. 32 and 33, illustrate a modification of Figs. 29, 30 and 31, while

In carrying our invention into effect, we construct of any suitable metal or material a frame A, of any size, shape or contour, according to the capacity of the machine we are intending to build, upon which we mount any desired number of more or less horizontal solid or hollow, and preferably, plain faced parallel or approximately parallel rollers, B, which may be of any suitable metal or combination of metals, each of which would be provided with a pair of bearings, C, and C', one at each end thereof, that is to say, there is at each end of the machine a row of bearings corresponding in number to that of the rollers, and the two series of bearings thus arranged are sleeved or loosely borne upon horizontal shafts or rods D, and D', preferably, borne by, and fixed to the frame A. Each bearing would be of such a width, that when the series are closed up together upon their respective shafts, the rollers B, would be in close and fluid tight touch with each other, the tension of a spring or springs $a$ or their equivalent, operating to keep them so closed until forcibly divided, and by reason of the center of one of the center bearings of each series being a fixed bearing (as at C'', Fig. 1,) such division must necessarily be in opposite directions therefrom.

We do not confine ourselves to any particular means of rotating the rollers B, nor the direction thereof, but we prefer to rotate half of these in one direction and the remainder oppposite thereto, by the means of a two way worm E, driven by any suitable and available power (which may be that of a neighboring shaft connected by a band to the pulleys $b$) and borne by suitably arranged plumber blocks upon the front of the machine A, and so located as to be above, and in gear with, worm wheels F, keyed or otherwise fixed upon the projecting spindle ends of the rollers B.

To obtain an equal division or space between each roller B, and its neighbor, a like space must be made between each bearing and its neighbor, and in order that the spaces between the rollers may be equal from end to end, both sets of bearings C, and C', must be spaced equally, and to attain this we provide at the front end of the machine a transverse shaft G, and at the back end a like shaft G', both of which (except at their bearing ends) are rectangular in cross section, and upon these are loosely mounted a series of wheels or part wheels H, capable of easily sliding therealong. Each wheel or part wheel may be provided with external teeth, so that these may be rotated by pinions mounted upon a third shaft H', at each end of the machine, but we prefer to dispense with the cogs on wheels H, and employ a mechanical equivalent by mounting upon each end of the shaft G, a spur wheel G'', which gears with pinions H'' upon the ends of the front shaft H', and upon each end of the shaft G', a like spur wheel G''' in gear with a like pinion upon the back shaft H', and upon one end of both shafts H', we mount a wheel or handle H''' by which these may be rotated.

Upon either or both sides of each wheel or part wheel H, we form or connect thereto a web $c$ or in other words the periphery of said wheels or part wheels are graduated in thickness or width from end to end, or from one half its circumference to the other. The said wheels or part wheels are so arranged upon their shafts that their said webs $c$ occur between lugs C''' upon the lower surfaces of the bearings C, and C', and the thinnest portion of web c must be such as to permit the bearings to close together when desired, but if the wheel H''' or its equivalent be rotated, so that the thicker portion of web c is brought between the lugs C''' the bearings and consequently the rollers B, will be separated a distance equal to the thickness of the web interposed, and as the bearings are so divided, these and the wheels H, would be slid along their respective shafts against the tension of the springs or their equivalents a. Thus an equal division would be made between each bearing and its neighbor, and as such division would regulate the straining capacity or cut, an alteration therein would be needed only when a fresh kind of paper was to be made and then, may be, only to a very infinitesimal extent. Therefore the web c may be only partly around the wheels H. Hence the term "part wheel."

Figure 7:
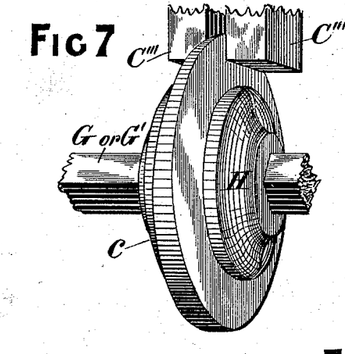
Fig. 7, is an enlarged perspective view of one of the spacing or adjusting wheels, provided with a graduated web, showing how said web engages with, and between, the lugs of the bearings, to be hereinafter fully explained.
Figure 8:
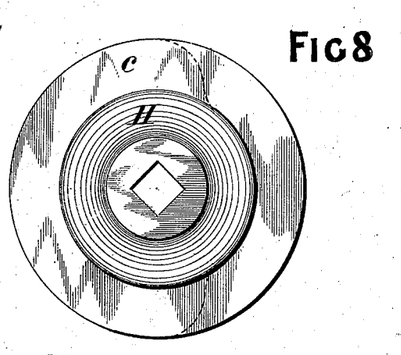
Fig. 8, is a side elevation of the same wheel.
Figure 10:
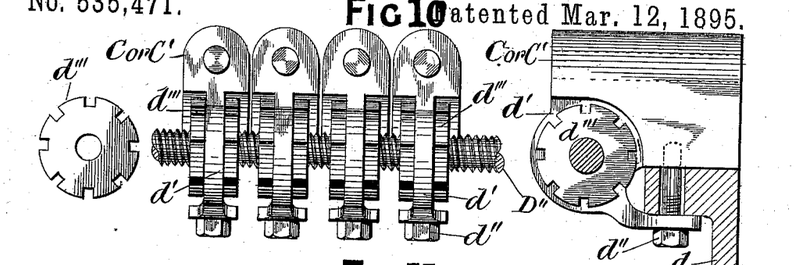
Fig. 10, Sheet 4, illustrates an alternative manner of adjusting the spaces between the rollers.

The construction of the wheels H, and the manner in which their webs c engage with the lugs C''' of the bearings, will be clearly understood by reference to Figs. 7 and 8, Sheet 3, the dotted curved lines on c in the latter figure indicating that the right hand portion may be dispensed with when only a part wheel is to be employed; or as an alternative arrangement we may construct the said bearings and the spacing mechanism thereof as at Fig. 10, Sheet 4. In this form the bearings may rest and slide upon a slotted shelf d and their front faces be reduced in width so as to form webs d' which depend, and abut against the under surface of shelf d, and by means of screw bolts d'' passing upward through longitudinal slots in shelf d and screwing into the bearings, these may be retained thereby in the position desired. In this arrangement threaded shaft D'' would take the place of shafts D, and D', in the previous arrangement, and this passing through webs d' or suitable chucks therein, would have mounted thereon at each side of the webs d' nuts d''' and by the rotation of these the bearings could be divided in any manner desired and when in the required position the tightening of the screws d'' would there retain them.

Figure 2:
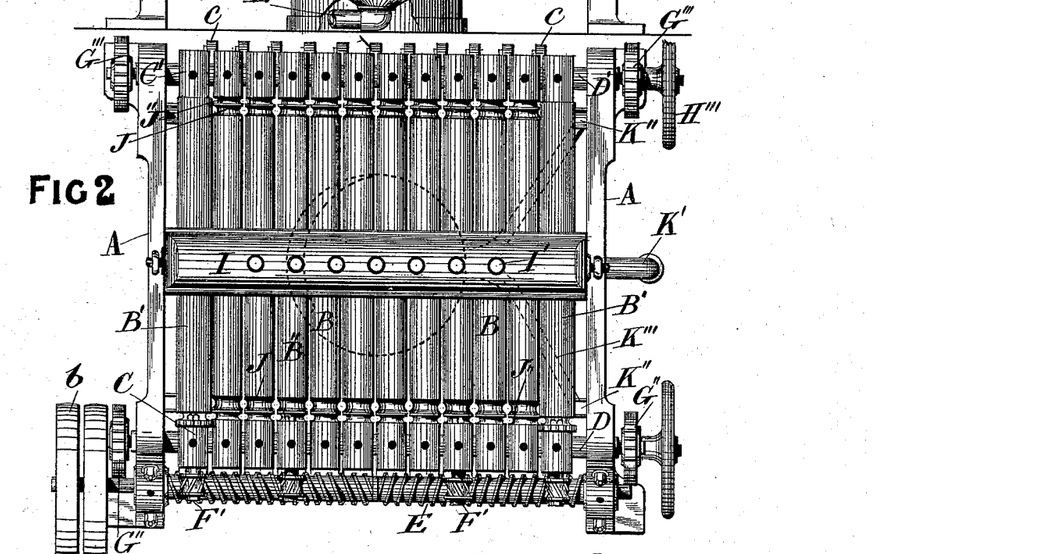

The rollers B, may be perfectly horizontal, or slightly deviating therefrom, such deviation determining the position of the vat or hopper by which the pulp would be deposited upon the rollers, but when these are perfectly horizontal, as we have chosen to illustrate them in the drawings, we prefer to place the hopper I, centrally of their length or thereabout, and into this the pulp to be strained would be placed, or fed thereinto by any convenient means, and in this we may provide one or more depending divisions under which the pulp would pass, and be steadied thereby, so that this may make a smooth and even exit therefrom on to the rotating rollers, or in lieu of said divisions we may form holes I' in the bottom of hopper I, for the same purpose as at Fig. 2, Sheet 1. When the rollers B, deviate from the horizontal, the lower or back end of each, and when truly horizontal both ends of each, would be reduced in diameter for a certain portion of their lengths, as shown at J, Fig. 2, Sheet 1, so that a circular space is thereby formed between each roller and its neighbor. A like but smaller space J'' may be formed in both ends of each roller as a drip to prevent the lubrication of the bearings from reaching or coming in contact with the pulp.

Figure 3:
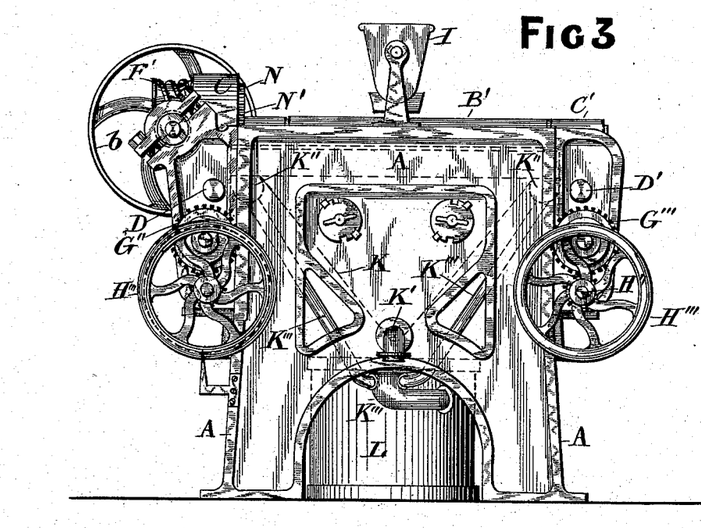
Figure 4:
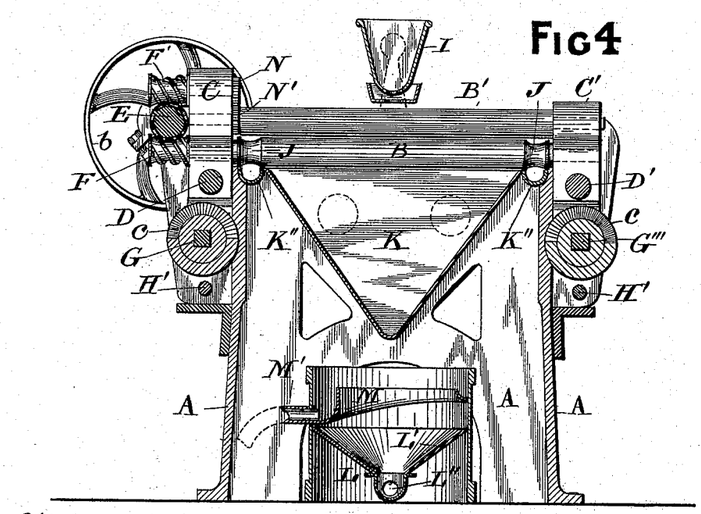
Fig. 4, is a vertical sectional elevation taken between the rollers at or about the center of Figs. 1 and 2.
Figure 5:
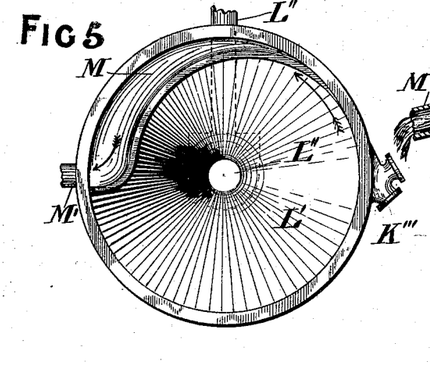
Figs. 5 and 6, Sheet 3, are enlarged plan, and central vertical section respectively, of the receiver or vortex chamber, shown in position in Figs. 1, 3 and 4, and by dotted outline in Fig. 2.
Figure 6:
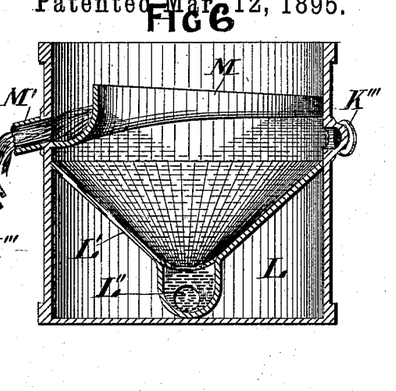

The pulp to be strained having been fed into the hopper I, and deposited upon the rollers B, would be carried therealong and turned over and over by the rotary motion thereof, and only such part of the pulp as was in a condition for the required use would fall through the spaces between the rollers, and this would occur in one unbroken continuous stream, and would be received into a suitable receptacle K, shown more particularly by the sectional view Fig. 4, Sheet 2, and from this conveyed by gravity or otherwise, through the outlet K' thereof (Figs. 1, 2, and 3) to where required, which may be directly to and upon the wet end of the paper making machine, while the remainer of the pulp, too thick or "knotty" to pass between the rollers, would be conveyed therealong and fall down through the spaces J, at the ends thereof into troughs K'' at each end of the machine, (shown in Fig. 2, and by dotted lines in Fig. 3, and more particularly in Fig. 4,) from which it would be conveyed by conduits K''' in a tangential direction into a suitably situated stationary circular wooden or other vessel L, preferably, but not imperatively, located beneath the rollers B. The vessel L, is particularly constructed for the purpose of dealing with the pulp in this condition and will be better understood by reference to the enlarged plan and section, Figs. 5 and 6, and by reason of the pulp entering vessel L, tangentially, a circular or rotary current is formed thereby in the direction of the arrow, Fig. 5, and the upper surface of the bulk would assume a dish-like form as at Fig. 6, arising from the combined influence of gravity, centrifugal force, the dish-like bottom L', and the opening or outlet L'', in the bottom of the vessel. Upon the inner surface of the wall of vessel L, and extending about half-way therearound, we attach a graduated channel M, and by reason of the vortex formed by the influences previously mentioned, the heavier or knotty portion of said pulp, would fall to the lower part of the dish-like bottom L', and pass out through the outlet L'', and be suitably dealt with by an auxiliary knotter, while the lighter or more fluid portion would be the upper or highest surface of the vortex, and as this rose above the level of the lowest or wedge-like end of channel M, would pass thereover and flowing around channel M, would pass out at opening M', as shown at Fig. 6, and be conveyed therefrom to a suitable rotary or other pump by which it would be raised and again passed into the vat or hopper I, and there mingling with fresh pulp would be conveyed therewith over the rollers again and be treated as before; or in lieu of the vessel L, we may employ a square or other shaped receiver, provided internally with baffle plates, under and over which the pulp would pass, the heavier or knotty or hanked portion passing out through an opening in or near the bottom thereof, while the lighter portion would pass out through an opening in the upper part and both be treated as before stated.

Figure 1:
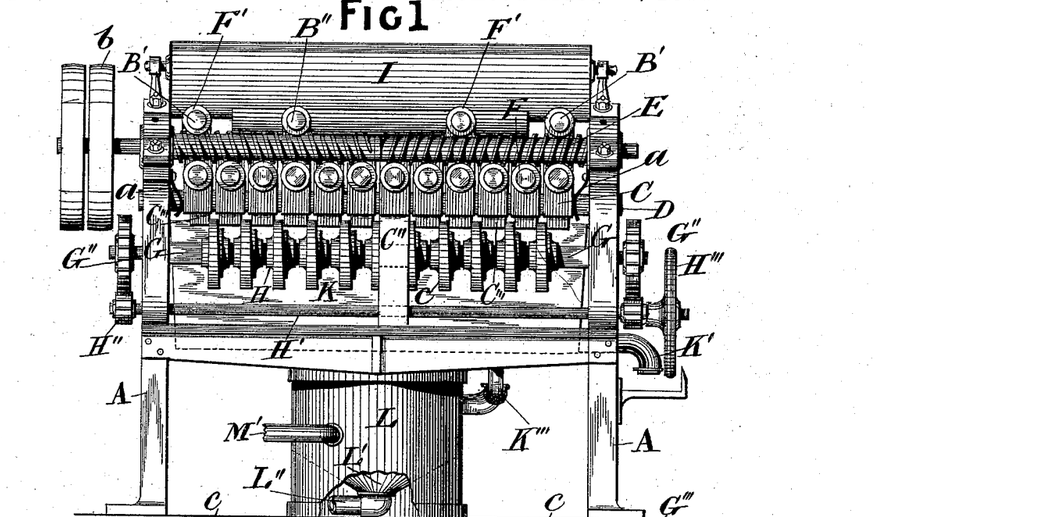
Figures 1 and 2, Sheet 1, are front elevation and plan respectively, of a complete machine, constructed according to our invention, in which perfectly parallel rollers are used.

In order that the flow of pulp from the hopper I, may not at any time overflow the rollers B, we form the end bearings of each series capable of carrying an auxiliary or jockey roll B' (Figs. 1, 2, 3, and 4) these being mounted immediately over the outside rollers B, and a distance therefrom capable of allowing an easy flow of pulp to pass between them, and by the means of a worm wheel F' in gear with the worm E, and mounted upon a short spindle passing through the bearing carrying upon its opposite end a pinion N, in gear with a like pinion N', on roll B', the rotation of roller B, and roll B' would be coincident, and in order to further facilitate the even distribution of the pulp, jockey rollers B'' may be used mounted and rotated in like manner over as many of the intervening rollers B, as may be required according to the capacity of the machine or as shown in Fig. 1. The function of these jockey rollers B' is simply to prevent the free flow of the pulp over the outside rollers of the series without having first been subjected to an action similar to that of passing down between two rollers B B of the main series. These rollers B' practically form end walls to the bed of rollers B and all material which passes through the spaces between the rollers B' and the main rollers B falls into the hopper K and is thus ready to pass out with that which has passed between the main rollers B B.

Figure 9:
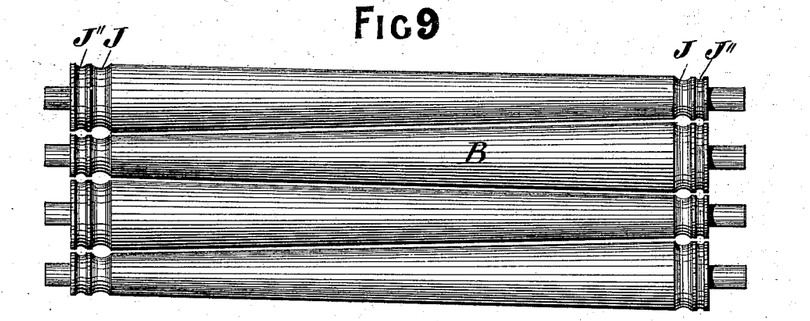
Fig. 9, illustrates an alternative manner of constructing the rollers when these are to be rotated, as in Fig. 2.

We have previously stated that the rollers B, may be perfectly horizontal or slightly deviating therefrom, and in order to obtain a non-horizontal surface without tilting one end of the machine or without alteration to the component parts thereof, we construct the rollers in a slightly taper form as at Fig. 9, Sheet 3, and these collectively form alternating sloping surfaces over which the pulp would flow, some portion in one direction and some in the opposite, which would have the effect of still further agitating the pulp to prevent coagulation, which may be further prevented by a judicious use of a suitable sprinkler arranged to deposit water upon the pulp while upon the rollers and which will be hereinafter explained. The spacing devices previously mentioned would operate in connection with these rollers as with the others, and the opposing surfaces of each pair would in all cases be parallel, whatever may be the width of the cut employed.

Figure 11:
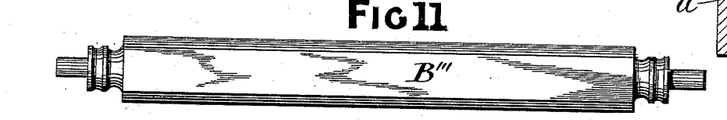
Fig. 11, is a plan view of one form of oscillating rod or bar, we may employ in lieu of the rotary rollers shown in the previous views.
Figure 12:
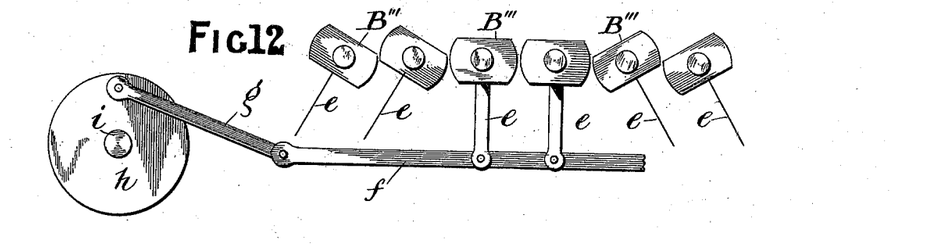
Fig. 12, is a diagram of the mechanism we may employ for imparting an oscillatory movement to the bars or rod, Fig. 11.
Figure 13:
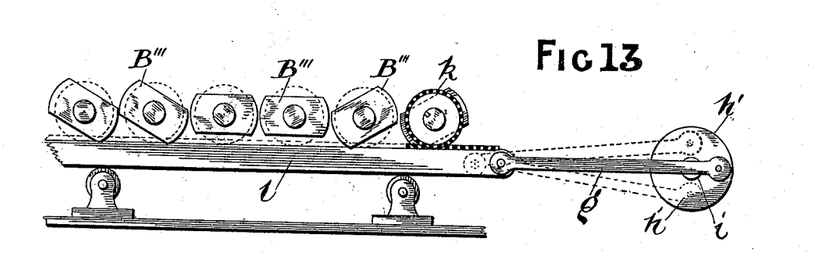
Fig. 13, illustrates a rack and pinion motion which we may employ in lieu of the motion, Fig. 12.
Figure 14:
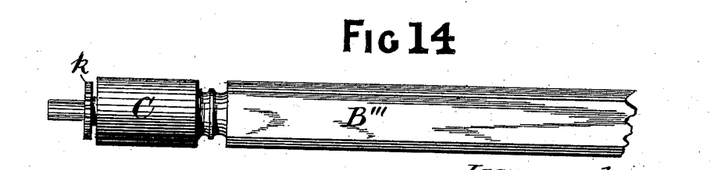
Fig. 14, is a plan view similar to Fig. 11, but constructed to be used in connection with the motion, Fig. 13.

In Fig. 11, we illustrate a roller B''' upon which a flat surface or surfaces have been formed for the whole of its length. In the adaptation of this form of roller we dispense with the rotary mechanism referred to, and mount the rollers B''' in the bearing C, and C', in such a manner, as to attach a depending arm or lever $e$ either to the spindle end of rollers B''' or to the roller itself, so that arm $e$, extends diametrically opposite to the flat surface of roller B'''. We have chosen to illustrate the latter, and in Fig. 12, we show a way of oscillating the rollers B''' by pivotally connecting the free ends of the arms $e$ to a transverse rod or plate $f$, one end of which is connected by a link or rod $g$, to a rotating disk or cam $h$ mounted upon a horizontal shaft $i$ the rotation of which by any suitable means would impart a to and fro horizontal movement to plate $f$ and an oscillatory or rocking movement to the roller B''' by means of the connecting levers $e$, or in lieu of said pendulums or levers $e$, we may mount upon the spindle end of each roller B''', a pinion wheel $k$ as in Fig. 14, and arrange these to gear with a toothed rack $l$, to which a horizontal movement may be imparted by the means of the link $g$, and a like but smaller cam or disk $h'$ upon a like shaft $i$ as in Fig. 13, and the extent of the oscillation of the rollers B''' will be easily understood from the figures referred to. In these forms, with the exception, that an oscillatory motion is given instead of rotary motion, the operation and manner of treating the pulp is identically the same as before described.

Figure 15:
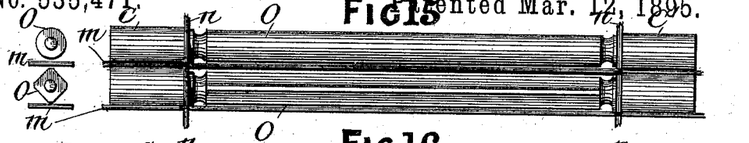
Figs. 15, and 16, Sheet 5, are plan views of other ways of constructing the said bars or rods, the smaller views to the left of which, are end views of the same respectively.
Figure 16:
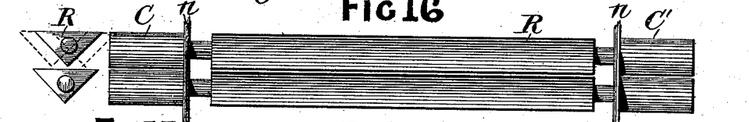
Figure 19:
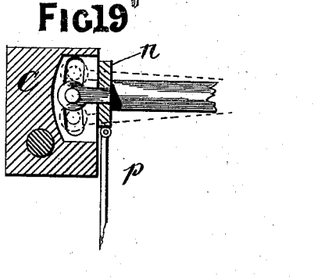
Fig. 19, is a vertical section of a bearing as we may construct it for use in connection with Figs. 16 or 17.

As a further modification of our invention, we illustrate in Figs. 15 and 16, Sheet 5, bars, plates or rods in lieu of the rotatory rollers B, or oscillating rollers B''', which may be circular, rectangular, triangular or polygonal in cross section, or any combination of these shapes. In this form we form a slot in the back of the bearings, which may be as in Fig. 19, and arrange the spindle ends of said plates, bars, or rods to engage therewith, substantially as therein shown.

Figure 17:
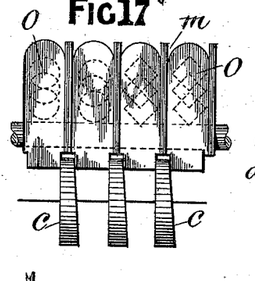
Fig. 17, is an end view of the bearings as these would be arranged when either of the rods or bars, Fig. 15, were used.
Figure 20:
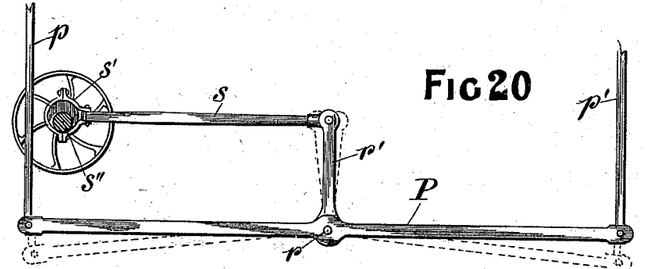
Fig. 20, is a diagram of a motion we may employ for imparting a vertical longitudinal oscillatory movement to the rods or bars, Figs. 15 or 16.
Figure 21:
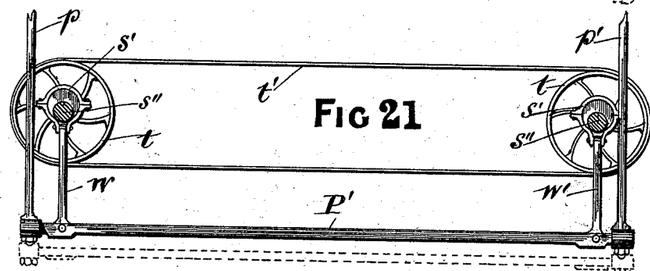
Fig. 21, is a slight modification of Fig. 20, for imparting a vertical and horizontal motion to the rods or bars.

Referring to Fig. 15, the bars or rods O, are mounted in the bearings as stated and between each bearing C, we place on edge one end of a division plate $m$, preferably, but not imperatively, borne upon the same spindle as bearing C, and these extend the whole length of rods O, the opposite ends engaging in like manner with and between the bearings C', and move laterally therewith as bearings C, and C', are spaced, which would be preferably by the means illustrated by Fig. 17. The whole series of rods or bars O, are connected at each end by a transverse plate $n$ so that an up and down movement of plate $n$ would impart a like movement to all the bars simultaneously. In this form the movements of rods O, are vertical, which may be by both ends rising and falling simultaneously, or alternately, as may be desired. To obtain the latter movement we connect to the under surface of the front plates $n$, a depending rod $p$, as in Fig. 19, and to the back plates n, a like rod p' and these we connect to a horizontal rod P, situated beneath the rods O, and pivoted upon the frame of the machine at r. An arm r' connected to r is pivotally connected to one end of a link s, the opposite end being connected to an eccentric or its equivalent s' mounted upon a rotating shaft s''. By this means the rotation of shaft s'' would impart a rocking motion to rod P, and an up and down motion to rods p and p' alternately, and consequently a like motion to the rods or bars O. This motion will be clearly understood by reference to Fig. 20. To obtain the former movement so that both ends of rods O, rise and fall together we employ the motion shown by Fig. 21. In this form we arrange two shafts s'' upon which we mount pulleys t, connected by a band t' and by mounting an eccentric or its equivalent s' upon each shaft, and connecting these by vertical rods w and w' to a horizontal rod P' to which the rods p and p' are connected, both ends of rods O, would rise and fall together. The rising and falling of rods O, in either of the manners stated would cause the fine or usable pulp to be strained by percolating between these and the stationary plates m and the treatment of this and the unstrained portion would be substantially the same as in the previous forms.

Figure 18:
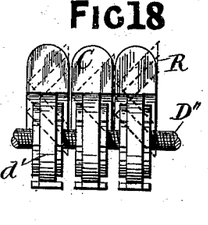
Fig. 18, is a similar view of Fig. 16.

In Fig. 16, we show bars R, of triangular shape in cross section, which work together as shown by the small end views of same, and these would be arranged in such a manner that one would rise while the other fell, or one may rise and fall while the other is stationary. In this form we dispense with the division plates m, the bars R, being so arranged that the base of one triangle may form a plate for, and operate in like manner in conjunction with, the apex of the neighboring bar. The pulp straining capacity or width of the cut is regulated by the distance between the apex of one triangle and the base of its neighbor, such capacity or division being attained by the employment of either of the adjusting devices previously mentioned, but preferably that of Fig. 10, as shown by Fig. 18, the manner of treating with the strained and unstrained pulp being the same as in the previous methods.

Figures 22, 23:
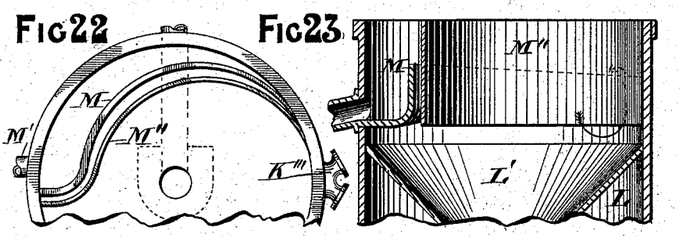
Figs. 22 and 23, Sheet 6, illustrate an alternative construction of the vortex chamber shown in Figs. 5 and 6.

In Figs. 22 and 23 we illustrate certain modifications which we may adopt in connection with the vortex chamber L, to prevent the scum that may collect upon the surface of the pulp therein from passing over the wall of the channel M, and away through the channel M'. We attain this by fixing to the walls of hopper L, a vertical plate M'', parallel with, and a slight distance from the wall of channel M, and extending downward to the level of the bottom thereof. By this means when the surface of the pulp has risen above the bottom of plate M'', the clear or light pulp only would pass up between plate M'', and the wall of the channel M.

Figures 24, 25, 26, 27, 28:
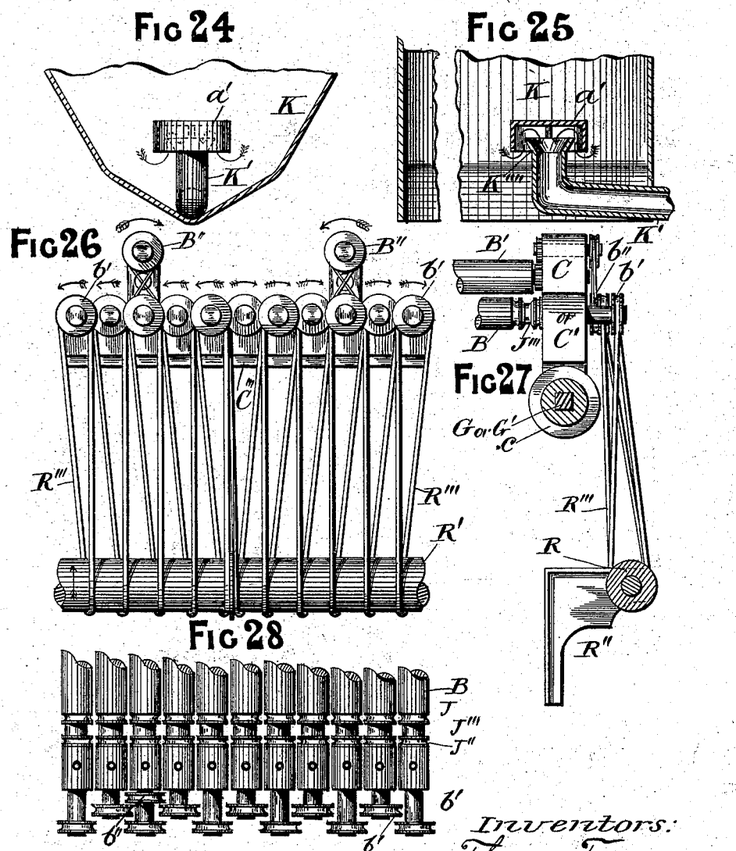
Figs. 24 and 25, illustrate an alternative form of the chamber for the reception of the strained or refined pulp.
Figs. 26, 27, and 28, are front elevation, part sectional elevation and plan respectively, of part of a set of bearings illustrating an alternative means for rotating the rollers.

In Figs. 24 and 25, we illustrate a modification we may employ, for the same purpose, in connection with the chamber K, for the reception of the strained or refined pulp. We construct a trap for the scum by arranging that the outlet K', extends inwardly and upwardly within chamber K, terminating in a funnel shaped mouth K'''', surmounted by a bonnet a'. By this device when the level of the pulp has risen above the lower edges of bonnet a', which it must do before it could pass over funnel K'''', the clear and usable pulp only would pass through outlet K' to the paper making machine.

In Figs. 26, 27, and 28, we illustrate the means we may employ for rotating the rollers B, B', B'', in lieu of the worm E, and worm wheels F, F', previously described and shown. In this form we mount upon the spindle ends of each of the rollers B, a grooved pulley b', the end of each alternate spindle of which is extended in length, so that the pulleys of the rollers 1, 3, 5, may overlap those of rollers 2, 4, 6, and so on, for the whole of the series as shown by Fig. 28. A broad roller spindle or hollow drum R' mounted upon brackets R'' fixed upon the frame A, carries endless straps, wires or cords R''', which pass over and engage with the pulleys b' the rotating of drum R' by any convenient means (which may be that previously employed for rotating worm E), imparting motion to the pulleys b', and the rollers upon which they are fixed, and it is obvious that notwithstanding drum R' may always rotate in one direction that the direction of rotation of the rollers will depend upon and may be varied by, the crossing of the cords or straps R''', before passing over the pulleys b' which may be that half the rollers B, may rotate to the left and the remainder to the right as indicated by the arrows in Fig. 26. A duplicate pulley b'' would be mounted upon such rollers B, as would be surmounted by a jockey roller B' or B'', the spindle N, in connection with which would carry a similar pulley connected by a short strap or cord to the pulley b''.

Figure 34:
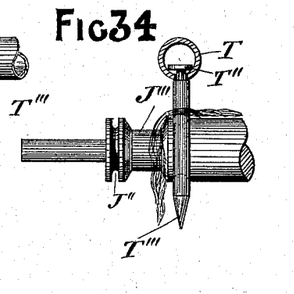
Fig. 34 is a detail view of Fig. 32.

It may occur that under certain conditions of consistency or temperature the pulp that passes down through the spaces between the rollers B, afforded by the grooves J, instead of falling entirely into the conduits K'', and from these through channel K''' to vessel L as previously described, may have a tendency to creep along the under surfaces of rolls B, and fall into the chamber K, thus contaminating the refined pulp therein, to obviate which, we extend the distance between the grooves J, and J'' and the intervening space we reduce in diameter as at J''', (shown in Figs. 27, to 34,) and the downward passage formed by grooves J, we cause to be occupied by inverted U shaped pieces S, made of metal, vulcanite, leather, or other suitable material, the legs of which may be such shape, size and distance apart, that one piece S, may fill the two downward passages J, formed by three rollers B, or one of the legs S, may be reduced in diameter as at S', so that two such such legs S', would be required to fill one space J, thus using two such U shaped pieces to fill three spaces J, or both legs of piece S, may be so reduced if desired, and the ends of the legs of piece S, may be flattened as at S'', or pointed as at S'''; or as an alternative form we may suspend laterally above the rollers B, a hollow tube T, provided with a longitudinal slot T', with which engage the heads T''' of depending legs T'''', these being arranged to occupy the spaces J, and capable of sliding in slot T' as the rollers are spaced. Both these devices will be clearly understood by reference to Figs. 29 to 34. By either of these arrangements the thick pulp is prevented from passing down through spaces J, or if any should so pass, the quantity would be small, and would trickle down piece S, or legs T'''' and be collected in another vessel, which may or may not communicate with the chamber L, but the bulk of such pulp would overflow piece S, or flow between the legs T'''', and fall through the spaces J''' (as indicated by the arrows in Fig. 30 and more graphically by Figs. 31, and 34), into the troughs K'' and from there into vessel L, as previously described and we wish it understood that the tapered rollers shown in Fig. 9, may in like manner be provided with a recess J''', so as to be adaptable for the reception of piece S, or legs T'''', for the same purpose.

Figure 29:
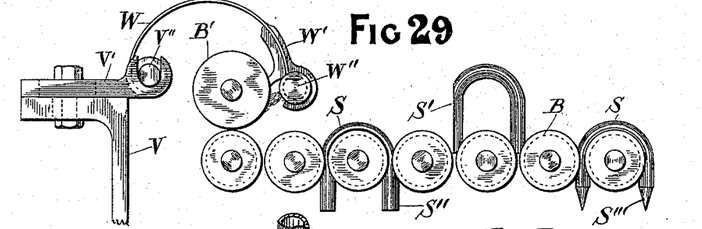
Figs. 29, 30, and 31, Sheet 7, are front elevation, plan and part sectional elevation respectively of part of a set of bearings, illustrating an alternative construction of the rollers, and a device for sprinkling water upon the pulp during the process of straining to be hereinafter explained.
Figures 30, 31:
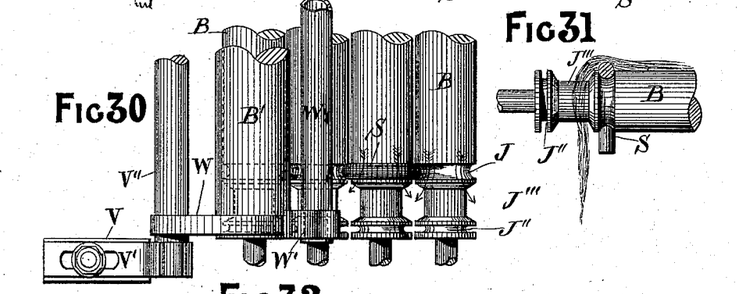
Figure 32:
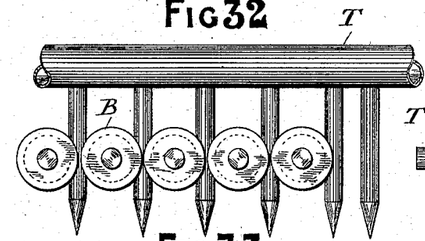
Figure 33:
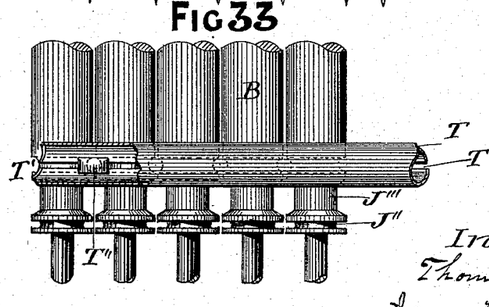

We have previously stated that a suitable sprinkler may be employed for depositing a fine stream of water upon the pulp while undergoing filtration, for reducing the consistency thereof, and preventing coagulation. We arrange this by mounting upon the frame A, a pair of brackets V, carrying adjustable plates V', which form bearings for the ends of a horizontal rod V'', parallel with the rollers B, and to this is connected by a pair of crescented rods or a plate W, a pair of preferably, metallic heads W', which carry a hollow tube W''', in which is formed longitudinally, either a very fine slit, or a series of very small holes, and by the means of an elastic tube or its equivalent, governed by a tap or cock, water is conveyed from a reservoir to the tube W'', and through the said slit or holes onto the jockey or other rollers, and from these to the pulp being strained, as shown by Figs. 29 and 30.

As the jockey rollers B' act as dams to prevent the overflow of the liquid pulp from the series of rollers without being strained, some such means may also be provided at the ends of the screening surfaces in which the modified forms of bars of Figs. 9 to 16 are employed.

Having now particularly described and ascertained the nature of our said invention and in what manner the same is to be performed, we declare that what we claim is—

1. In combination in a pulp straining machine the strainer surface made up of a series of movable bars with straining apertures between them, the bars above and at the ends of said series forming dams with straining spaces between the same and the bars of the series and the receiver K below the strainer bars, substantially as described.

2. In combination, the series of movable strainer bars with strainer spaces between them, the receiver K below the series of bars the troughs K'' extending from the ends of the strainer bars to convey the unstrained pulp, the vessel L adapted to receive the discharge from the troughs K'', said vessel having an outlet for the knotty pulp and a second outlet for the finer pulp, substantially as described.

3. In combination, the series of strainer bars, the receiver K below them, the troughs K'' extending from the ends of the strainer bars, the vessel L into which the troughs discharge tangentially, the dish like bottom of said vessel having an outlet for the knotty material, the plate M within the vessel L and near the top thereof and the outlet M' substantially as described.

4. In combination, the series of strainer bars, the means for moving them and the receiver K having a discharge pipe with a scum trap extending up within the receiver K, substantially as described.

5. In combination, the series of straining rolls, the series of adjustable blocks in which they are journaled, the wheels H having graduated webs C and the means for turning the said wheels, substantially as described.

6. In combination, the series of strainer rolls having the grooves J at the ends thereof and the spaces J''', the troughs K'', the receiver K and the pins or bars adapted to pass down through the grooves J and depend below the series of bars, substantially as described.

7. In combination, with the series of straining rollers with operating means therefor, the receiver and the jockey rollers arranged at the end of the series of rollers and above the same and the means for operating the jockey rollers, substantially as described.

8. In combination with a series of strainer bars, the hopper, the receiver and a sprinkler consisting of brackets V the adjustable plates V', the rod V'' journaled therein, the heads W' connected to the rod by arms W and the perforated tube W'' connected with any suitable water supply and carried by the heads, substantially as described.

In witness whereof we have hereunto set our hands in presence of two witnesses.

THOMAS TORRANCE.
JAMES HENRY HOWELL.

Witnesses:
GERARD MOSELY,
*Solicitor, Bristol.*
JAMES SMITH,
*Clerk to Gerard Mosely, Solicitor, Bristol.*